March 8, 1927.  E. DE STUBNER  1,620,083
FILTER
Filed Aug. 18, 1923
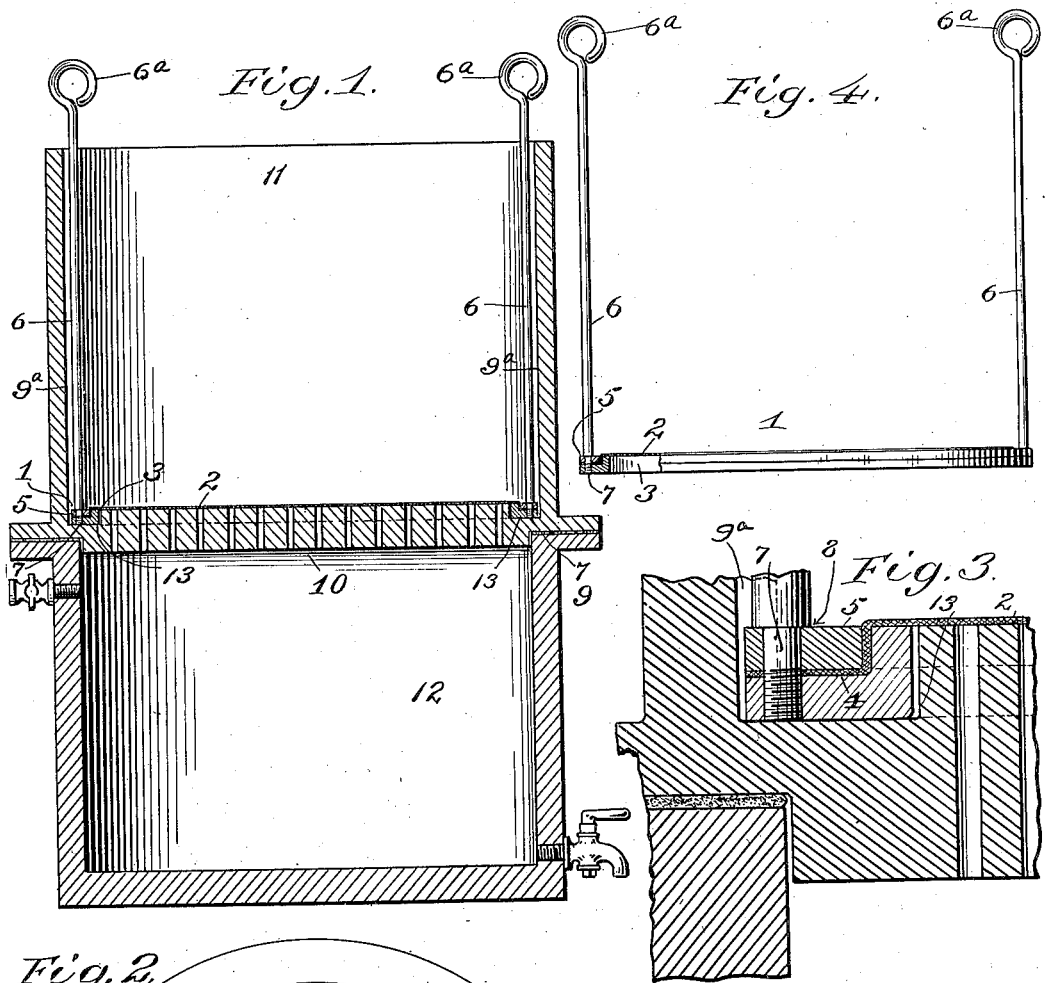
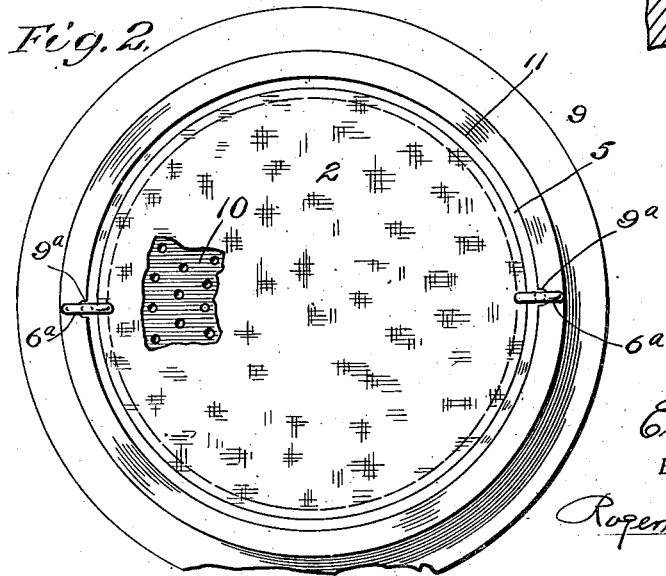
INVENTOR.
Emile de Stubner
BY
Rogers, Kennedy Campbell
ATTORNEYS.

Patented Mar. 8, 1927.

1,620,083

UNITED STATES PATENT OFFICE.

EMILE DE STUBNER, OF NEW YORK, N. Y.

FILTER.

Application filed August 18, 1923. Serial No. 658,024.

This invention relates to filters and has for its object the mounting of the filtering fabric in such manner that the liquid being filtered will be prevented from finding its way beneath the filtering fabric and thereby escaping without being subjected to the filtering action.

The invention is designed with special reference to the support of the filtering fabric over a permeable bed in a filtering vessel, although the invention is not limited to such special application; and the invention consists of a filtering unit comprising a holding frame of improved form for the filtering fabric, and a filtering fabric fastened in an improved manner to said frame. The invention consists also in the combination with a filtering vessel having a supporting portion therein, such for instance as a permeable bed, of a filtering unit supported within the vessel and comprising a frame and a filtering fabric fastened at its edge to the frame and extending over and across the permeable bed.

The invention consists also in providing the filtering unit with a handle or handles by means of which it may be inserted in place in the vessel or removed therefrom at will.

The invention consists also in the details of construction and combination of parts hereinafter described and claimed.

Fig. 1 is a vertical section through a filtering vessel having my invention embodied therein.

Fig. 2 is a top plan view of the same.

Fig. 3 is a vertical section on an enlarged scale on the line 3, 3 of Fig. 2.

Fig. 4 is a side elevation, partly in section, of the improved filtering unit.

Fig. 5 is a vertical section through one side of a filtering unit in modified form.

Referring particularly to Fig. 4, my improved filtering unit comprises an open annular frame 1 and a filtering fabric 2 extending across the open portion of the frame and fastened at its edge to the same. This frame in the present instance consists of a base ring 3 formed in its upper side with an annular cavity 4, and a clamping ring 5 which seats in the cavity, the edge of the filtering fabric being extended in the cavity and between the meeting faces of the two rings and being firmly clamped in place thereby. In the present instance, the clamping ring is held down on the base ring to confine the edge of the fabric, by means of two clamping devices in the form of rods 6 whose lower ends are reduced to form studs 7, and shoulders 8 at the junction of the studs with the enlarged portions of the rods. The studs extend through aligned holes in the two rings, and the extremities of the studs are threaded and screwed in threaded holes in the base ring, with the shoulders bearing against the upper side of the clamping ring; whereby by screwing up the rods, the clamping ring will be forced tightly against the base ring and will clamp and confine the edge of the filtering fabric between them. These rods are extended axially from the ring and serve as handles for the purpose presently to be described.

Referring to Figs. 1, 2 and 3, which illustrate the use of the filtering unit in a filtering vessel, 9 designates a vessel having a supporting portion 10 therein, which supporting portion is, in this instance, in the form of a permeable bed which divides the vessel into an upper compartment 11 to receive the liquid to be filtered, and a lower compartment 12 to receive the filtered liquid. This bed is formed at its outer portion with an annular cavity 13 in which seats the annular frame 1 of the filtering unit, the relation of the depth of the cavity to the height of the frame being such, that, with the frame so seated, the filtering fabric will extend across and will closely overlie and cover the permeable bed. The rods 6 extend upwardly along the wall of the vessel in semi-circular grooves 9ª formed in said wall and the rods terminate at their upper ends above the top of the vessel where they are provided with eyes 6ª, these rods thus constituting handles by means of which the filtering unit may be inserted in place in the vessel or removed therefrom as occasion may demand.

Due to the construction of my improved filtering unit as illustrated and described, and to the manner of supporting the same relative to the permeable bed, it will be seen that the liquid in the compartment 11 to be filtered cannot find its way beneath the filtering fabric and escape without being subjected to the filtering action. The edge of the fabric being firmly clamped and confined between the two rings of the holding frame, the fabric cannot be lifted or forced upwardly and permit the escape of the liquid from above. Any liquid which might find its way around the outer edge of the frame and between the same and the wall of the vessel, will be prevented from working in under the filtering fabric by reason of the engagement of the flat under face of the base ring with the flat bottom of the cavity in the bed, which surfaces are held in close fluid-sealed contact with each other by the weight of the body of liquid above, and by the suction beneath when employed in connection with a vacuum filter.

It will of course be understood that the parts of the filtering unit will be assembled outside of the filtering vessel, and the unit lowered into the vessel and inserted in the cavity in the permeable bed through the medium of the handles, as before described.

As shown in Fig. 5, the wall of the annular cavity in the base ring of the frame 1 is formed on a slope or incline, as shown at 14, and the inner edge of the clamping ring is correspondingly shaped to cooperate with said wall so as to bring about a wedging action of the parts on the edge of the filtering fabric.

In the foregoing description and the accompanying drawings, I have set forth my invention in the particular detailed form and construction which I prefer to adopt. It will be manifest, however, that the invention is not limited to these details and the latter may be variously changed and modified without departing from the spirit of the invention. And it will be understood that the invention is not limited to any particular form or construction of the parts except in so far as such limitations are specified in the claims.

Having thus described my invention, what I claim is:

1. In combination with a vessel provided with a permeable bed extending entirely across the interior thereof and having an annular cavity, an annular frame seated removably in the cavity and a filtering fabric fastened to the frame and extending over and resting on the permeable bed.

2. A filtering unit for filters, comprising a frame consisting of a base ring, a clamping ring, and a filtering fabric confined at its edges between said rings, and axially extending rods engaged at their ends with the rings and acting to clamp the rings together, and extending upwardly to serve as handles.

3. A filtering unit for filters, comprising a base ring provided with a cavity formed with an annular wall sloping outwardly and downwardly, a clamping ring adapted to seat in the cavity and having its inner edge sloped downwardly and outwardly to cooperate with the sloping wall of the cavity, a filtering fabric extending across the ring and having its edge seated between the sloping portions of the two rings, and means for clamping the rings together to confine the edge of the fabric; whereby the rings when clamped will act with a wedging effect and thereby tightly confine the edge of the fabric.

In testimony whereof, I have affixed my signature hereto.

EMILE DE STUBNER.